(12) United States Patent
Saadatmanesh et al.

(10) Patent No.: US 12,187,645 B2
(45) Date of Patent: Jan. 7, 2025

(54) CHEMICAL RESISTANT POLYMER CONCRETE AND METHODS OF USE THEREOF

(71) Applicant: Composite Construction, LLC, Tucson, AZ (US)

(72) Inventors: Hamid Saadatmanesh, Tucson, AZ (US); Ehsan Mahmoudabadi, Tucson, AZ (US)

(73) Assignee: COMPOSITE CONSTRUCTION, LLC, Tucson, AZ (US)

( * ) Notice: Subject to any disclaimer, the term of this patent is extended or adjusted under 35 U.S.C. 154(b) by 490 days.

(21) Appl. No.: 17/222,542

(22) Filed: Apr. 5, 2021

(65) Prior Publication Data

US 2021/0309573 A1    Oct. 7, 2021

Related U.S. Application Data

(60) Provisional application No. 63/005,037, filed on Apr. 3, 2020.

(51) Int. Cl.
*C04B 26/16*    (2006.01)
*B32B 5/16*    (2006.01)
(Continued)

(52) U.S. Cl.
CPC ............ *C04B 26/16* (2013.01); *B32B 5/16* (2013.01); *B32B 13/12* (2013.01); *C04B 14/06* (2013.01);
(Continued)

(58) Field of Classification Search
CPC ...... Y10T 428/24355; Y10T 428/24364; Y10T 428/24372; Y10T 428/24421;
(Continued)

(56) References Cited

U.S. PATENT DOCUMENTS 2,897,553 A    8/1959    Gorrow
2,961,738 A    11/1960    Thomas
(Continued)

FOREIGN PATENT DOCUMENTS

CN    109267102 A  *  1/2019    ............... C25C 1/10
EP    0572243 A1    12/1993
(Continued)

OTHER PUBLICATIONS

Machine translation (Espacenet) of CN 109267102 A. Translated Jun. 3, 2023. (Year: 2023).*
(Continued)

*Primary Examiner* — Maria V Ewald
*Assistant Examiner* — Ethan A. Utt
(74) *Attorney, Agent, or Firm* — NGUYEN TARBET IP LAW

(57) ABSTRACT

Chemical-resistant polymer concrete and methods of use thereof are described herein. The polymer concrete comprises a polymer layer and aggregates. The polymer layer is formed by reacting an epoxy vinyl ester resin promoted with cobalt and catalyzed by a peroxide. A concrete substrate is formed by layering the polymer layer and aggregates in thin alternating layers until a desired thickness is achieved. This layering method can reduce shrinkage of the concrete, thereby preventing cracking, deformation or debonding.

36 Claims, 3 Drawing Sheets

(51) Int. Cl.
| | |
|---|---|
| *B32B 13/12* | (2006.01) |
| *C04B 14/06* | (2006.01) |
| *C04B 14/38* | (2006.01) |
| *C04B 14/42* | (2006.01) |
| *C04B 26/06* | (2006.01) |
| *C04B 26/14* | (2006.01) |
| *C04B 40/00* | (2006.01) |
| *C04B 111/23* | (2006.01) |
| *C04B 111/72* | (2006.01) |

(52) U.S. Cl.
CPC ............ *C04B 14/386* (2013.01); *C04B 14/42* (2013.01); *C04B 26/06* (2013.01); *C04B 26/14* (2013.01); *C04B 40/0046* (2013.01); *B32B 2307/732* (2013.01); *C04B 2111/23* (2013.01); *C04B 2111/72* (2013.01)

(58) Field of Classification Search
CPC ....... Y10T 428/2443; Y10T 428/24942; Y10T 428/2495; Y10T 428/24967; Y10T 428/25; Y10T 428/252; Y10T 428/259; Y10T 428/26; Y10T 428/266; Y10T 428/269; Y10T 428/29; Y10T 428/2982; Y10T 428/31511; Y10T 428/31515; Y10T 428/31518; Y10T 418/31525; Y10T 428/31551; Y10T 428/31554; Y10T 428/31598; Y10T 428/31601; Y10T 428/3518; Y10T 428/31525; B32B 5/00; B32B 5/16; B32B 5/22; B32B 5/30; B32B 27/00; B32B 27/04; B32B 27/06; B32B 27/08; B32B 27/14; B32B 27/20; B32B 27/38; B32B 27/40; B32B 33/00; B32B 2260/025; B32B 2264/10; B32B 2264/1021; B32B 2264/30; B32B 2264/303; B32B 2307/714; B32B 5/18; E04B 1/00; E04B 1/02; E04B 1/04; E04B 1/12; E04B 1/14; E04B 1/18; E04B 1/20; E04B 1/28; E04B 1/30; E04B 1/62; E04B 1/92; E04B 2103/02; E04B 2103/04; E04C 1/00; E04C 1/40; E04C 1/41; E04C 2/00; E04C 2/02; E04C 2/04; E04C 2/06; E04C 2/10; E04C 2/20; E04C 2/22; E04C 2/24; E04C 2/26; E04C 2/44; C04B 26/00; C04B 26/02; C04B 26/10; C04B 26/14; C04B 26/16; C04B 2103/0045; C04B 2103/0068; C04B 2103/60; C04B 2111/00; C04B 2111/00241; C04B 2111/20; C04B 2111/23
USPC ....... 428/141, 142, 143, 149, 150, 212, 213, 428/215, 220, 323, 325, 331, 332, 337, 428/339, 357, 402, 409, 413, 414, 415, 428/417, 423.1, 423.3, 425.5, 425.6, 426, 428/428; 52/309.1, 309.13, 309.14, 52/309.15, 309.16, 309.17
See application file for complete search history.

(56) References Cited

U.S. PATENT DOCUMENTS

| | | | |
|---|---|---|---|
| 3,620,701 A | 11/1971 | Janetos | |
| 3,753,849 A * | 8/1973 | Duff | C04B 28/02 524/4 |
| 3,798,867 A | 3/1974 | Starling | |
| 3,903,714 A | 9/1975 | Horeni et al. | |
| 3,949,144 A * | 4/1976 | Duff | E04C 2/26 52/600 |
| 3,963,546 A | 6/1976 | Roberti | |
| 4,019,301 A | 4/1977 | Fox | |
| 4,052,866 A | 10/1977 | Saunders | |
| 4,079,568 A | 3/1978 | Wortman | |
| 4,244,156 A | 1/1981 | Watts, Jr. | |
| 4,439,071 A | 3/1984 | Roper, Jr. | |
| 4,694,622 A | 9/1987 | Richard | |
| 4,931,345 A | 6/1990 | Bottger et al. | |
| 4,993,876 A | 2/1991 | Snow et al. | |
| 5,079,050 A * | 1/1992 | Harry | C25B 9/00 204/279 |
| 5,118,569 A | 6/1992 | Kuroda et al. | |
| 5,198,280 A | 3/1993 | Harpell et al. | |
| 5,398,461 A | 3/1995 | Rose | |
| 5,458,683 A | 10/1995 | Taylor et al. | |
| 5,505,030 A | 4/1996 | Michalcewiz et al. | |
| 5,513,477 A | 5/1996 | Farber | |
| 5,640,825 A | 6/1997 | Ehsani et al. | |
| 5,694,734 A | 12/1997 | Cercone et al. | |
| 5,753,340 A | 5/1998 | Welch et al. | |
| 5,996,521 A | 12/1999 | Kitano et al. | |
| 6,224,294 B1 | 5/2001 | Mansfield | |
| 6,382,878 B1 | 5/2002 | Yang | |
| 6,519,909 B1 | 2/2003 | Fawley | |
| 6,843,194 B1 | 1/2005 | Baudet | |
| 7,429,149 B2 | 9/2008 | Price et al. | |
| 7,556,752 B1 | 7/2009 | Hicks | |
| 7,721,494 B2 | 5/2010 | Lee | |
| 7,780,375 B1 | 8/2010 | Khachaturian et al. | |
| 8,341,860 B2 | 1/2013 | Boyce et al. | |
| 8,353,643 B2 | 1/2013 | Khachaturian et al. | |
| 8,465,228 B2 | 6/2013 | Doleshal | |
| 8,628,275 B1 | 1/2014 | Trader et al. | |
| 8,650,831 B2 | 2/2014 | Ehsani | |
| 8,696,849 B2 | 4/2014 | Butler | |
| 9,038,353 B2 | 5/2015 | Huncovsky | |
| 9,307,796 B2 | 4/2016 | Butler | |
| 9,890,546 B2 | 2/2018 | Ehsani | |
| 10,119,238 B2 | 11/2018 | Doudican et al. | |
| 10,619,321 B2 | 4/2020 | Hess et al. | |
| 10,689,868 B2 | 6/2020 | Saadatmanesh et al. | |
| 11,118,364 B2 | 9/2021 | Saadatmanesh et al. | |
| 11,319,706 B1 | 5/2022 | Khedmatgozar Dolati et al. | |
| 11,718,965 B2 | 8/2023 | Saadatmanesh et al. | |
| 2004/0048022 A1 | 3/2004 | Pratt | |
| 2004/0074199 A1 | 4/2004 | Gordin et al. | |
| 2004/0211148 A1 | 10/2004 | Foust et al. | |
| 2008/0017263 A1 | 1/2008 | Robinson et al. | |
| 2009/0165404 A1 | 7/2009 | Choi | |
| 2014/0115975 A1 * | 5/2014 | Bussio | E02D 29/12 425/432 |
| 2015/0159387 A1 | 6/2015 | Chou et al. | |
| 2015/0190972 A1 | 7/2015 | Ehsani | |
| 2016/0060892 A1 | 3/2016 | Odegard et al. | |
| 2016/0076249 A1 | 3/2016 | Gibson et al. | |
| 2016/0145882 A1 | 5/2016 | Ehsani | |

FOREIGN PATENT DOCUMENTS

| | | |
|---|---|---|
| WO | 9523898 A1 | 9/1995 |
| WO | 2006032033 A2 | 3/2006 |
| WO | 2016007503 A1 | 1/2016 |

OTHER PUBLICATIONS

Hoff, G.W. "Strong Medicine. Fiber-reinforced polymer materials can help cure many ills that beset concrete" Concrete Construction (2000):40-47.

* cited by examiner

CHEMICAL RESISTANT POLYMER CONCRETE AND METHODS OF USE THEREOF

CROSS REFERENCES TO PREVIOUS APPLICATIONS

This application is a non-provisional and claims benefit of U.S. Provisional Application No. 63/005,037 filed Apr. 3, 2020, the specification(s) of which is incorporated herein in their entirety by reference.

BACKGROUND OF THE INVENTION

Field of the Invention

The present invention relates to polymer concrete compositions and methods of forming concrete substrates.

Background Art

Concrete is a composite material comprised of water, aggregates and cement. When mixed together, the components form a paste mixture that can be poured, molded, and then hardened by curing. Concrete is typically used in construction applications ranging from simple structures such as concrete blocks, walls, floors, and foundations to mega structures such as roads, pillars, bridges, and dams. Although concrete is a widely used building material, it is susceptible to substantial damage when exposed to acid conditions. Exposure to acid can erode and completely destroy the integrity of a concrete substrate and can turn it into rubble in a matter of hours, depending on the acid concentration. This issue is most problematic when concrete is used in acidic environments such as in mines, chemical plants, waste-water treatment facilities, acid blending facilities, etc.

One existing solution to minimize acid exposure is to apply acid-resistant coatings in the form of spray-on paint on the concrete substrate, thereby protecting it from acid attack. For example, epoxy, polyurethane and vinyl ester have been used as a top coating in thin-layers to coat and protect concrete and sometimes in association with sand that is broadcasted on top of the coated surface to create skid-resistance. However, a problem with this type of protection is that a very thin layer of coating is applied, and in the event that said layer is abraded or otherwise damaged due to surface impact, it provides a pathway for acid to reach the concrete surface and cause major damage. Hence, there exists a need to resolve the problem of acid damage to concrete substrates.

BRIEF SUMMARY OF THE INVENTION

It is an objective of the present invention to provide chemical resistant polymer concrete and methods of forming concrete structures that are resistant to damage caused by exposure to acidic conditions, as specified in the independent claims. Embodiments of the invention are given in the dependent claims. Embodiments of the present invention can be freely combined with each other if they are not mutually exclusive.

In some aspects, the present invention features a polymer concrete that requires no coating and is completely resistant to acid attack. In one embodiment, the polymer concrete comprises multiple stacked composite layers. Each composite layer may comprise a polymer layer and an aggregate material disposed on the polymer layer. In some embodiments, the concrete can also be reinforced, if needed, with acid resistant carbon or glass fabrics or rods. Without wishing to be bound to a particular theory or mechanism, the present invention addressed the root cause of the acid damage problem by modifying the concrete itself. As a non-limiting example, the concrete composition may comprise a vinyl ester resin and silica or quartz. The vinyl ester resin can act as a binder to the aggregate material, thereby forming a polymer concrete without the impact and abrasion problems when sufficient thickness is achieved.

One of the unique and inventive technical features of the present invention is a method of laying a polymer concrete that reduces or eliminates any cracking, deformation or debonding. The methodology involves building the polymer concrete layer by layer to achieve a final desired thickness. Without wishing to limit the invention to any theory or mechanism, it is believed that the technical feature of the present invention advantageously provides for decreased shrinkage due to bulk application while still producing an acid resistant concrete with the desired thickness. None of the presently known prior references or work has the unique inventive technical feature of the present invention. Furthermore, the inventive technical features of the present invention is counterintuitive. The reason that it is counterintuitive is because the feature of the present invention contributed to a surprising result. One skilled in the art is aware that a problem that arises from applying concrete is that when it is laid in thick layers, the polymer binder will shrink due to the large volume involved, causing significant cracking and deformation which will result in an unacceptable outcome of the concrete having no bond to a surface. Surprisingly, the application of layers in the method of the present invention results in a polymer concrete of any desired thickness with no shrinkage or cracking. Thus, the feature of the present invention is counterintuitive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
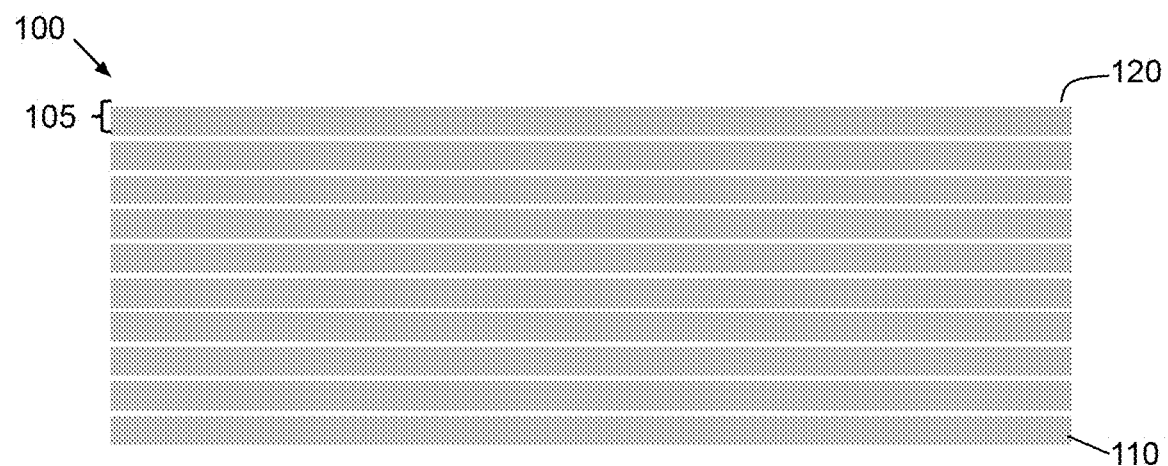
FIG. 1 shows a non-limiting embodiment of the present invention in which a polymer concrete is comprised of multiple composite layers.

Following is a list of elements corresponding to a particular element referred to herein:

10 pre-existing floor
15 repaired floor
100 polymer concrete
105 composite layer
110 polymer layer
120 aggregate
140 reinforcing material As used herein, the term "substrate" can refer to a free-standing structure or a coating. For example, the free-standing structure may be a backer board. As another example, the substrate may be a top coating applied to a pre-existing surface.

As used herein, the term "dry" refers to a state where a composite layer of the polymer concrete is substantially tack-free. One of ordinary skill in the art would understand that "tack-free" refers to a state where the composite layer is sufficiently robust to resist damage by touch or settling dirt. Tack-free time refers to a period from the start of cure to a point when the composite layer is tack-free. Tack-free can be determined as the point when the surface no longer feels sticky. In a more definitive method, it can be determined by briefly pressing a polyethylene film against the surface and checking for any adhering material when the film is removed.

In preferred embodiments, where the surface has a large surface-area, for example, basement floor, garage floor, or road, the subsequent composite layers are added when the previous composite layer is tack-free so that workers are able to walk on the surface of the previous composite layer. Depending on environmental conditions, such as ambient temperature and relative humidity, the tack-free time may range from about 1 hour to at least 24 hours. For example, the next composite layer may be laid about 2 hours after the previous composite layer in a dry environment at 75° F. As another example, the next composite layer may be laid about 4-6 hours after the previous composite layer in an environment at 80° F. and 90% humidity.

As used herein, the term "cure" refers to a state when the polymer concrete has set and hardened. Cure may be considered to be achieved when the polymer binder is at least 70% cross-linked. Over time, the polymer concrete can achieve 90% cross-linking. The term "cure" is not the same as "dry" or "tack free". The composite layer may be dry or tack-free, but not cured.

As used herein, the term "broadcasting to the point of refusal" means that the aggregates are applied on the polymer layer until the aggregates no longer stick to the polymer coating, e.g. extra aggregate can be removed via sweeping or vacuuming when the composite layer is tack-free.

Figure 2:
FIG. 2 shows a non-limiting embodiment of the polymer concrete having reinforcing material disposed in the composite layers.

Referring now to FIGS. 1-2, in some embodiments, the present invention features a polymer concrete (100) comprising multiple stacked composite layers (105). Each composite layer (105) may comprise a polymer layer (110), and an aggregate material (120) disposed on the polymer layer (110). As shown in FIG. 1, one of ordinary skill in the art would understand that the aggregate material is disposed on the polymer layer (110) such that some of the aggregate particles may be completely disposed in the coating, some may be protruding out of the surface, and some may be on top of the coating.

In preferred embodiments, the polymer concrete (100) is resistant to acid attack. For example, the polymer concrete (100) is resistant to deterioration when exposed to acidic compounds having a pH lower than 7. In other preferred embodiments, the polymer concrete (100) is resistant to cracking, debonding, or deformation.

In some embodiments, the polymer concrete (100) comprises at least two stacked composite layers (105). For example, the number of composite layers (105) can range from 2 to 20 layers. In some embodiments, the number of composite layers (105) can range from 2 to 50 layers. In some embodiments, a thickness of each composite layer can range from about 1 mm to about 9 mm. In a preferred embodiment, the thickness of each composite layer is about 1 mm to about 5 mm. In another preferred embodiment, the thickness of each composite layer is about 2 mm to about 3 mm. At most, the thickness of each composite layer is 9 mm. In a non-limiting embodiment, the polymer concrete (100) may comprise ten composite layers (105) that have a combined thickness of about 1 inch or more. In another non-limiting embodiment, the polymer concrete (100) may comprise ten composite layers (105) that have a combined thickness of about 1 centimeter or more.

According to some embodiments, the polymer layer (110) is prepared from a polymer composition comprising a vinyl ester and a peroxide. The peroxide acts as a catalyst or initiator in the curing process (cross-linking) of the vinyl ester resin. In one embodiment, the polymer composition may comprise at least 90 wt % of the vinyl ester resin and about 0.5 wt % to about 5 wt % of the peroxide. In some embodiments, the polymer composition may comprise at least 75 wt % of the vinyl ester resin and about 0.05 wt % to about 10 wt % of the peroxide. A non-limiting example of the vinyl ester resin is a novolac epoxy vinyl ester resin. Examples of the peroxide include, but are not limited to, methyl ethyl ketone peroxide, cumene hydroperoxide, and benzoyl peroxide.

In some embodiments, the polymer composition may include about 0.05 wt % to about 0.5 wt % of a promoter. In some embodiments, the polymer composition may include about 0.01 wt % to about 1 wt % of the promoter. The promoter is added to the vinyl ester resin to produce the curing reaction (e.g. gelling) and control cure times and characteristics. Non-limiting examples of promoters include dimethylaniline, diethylaniline, and cobalt promoters such as cobalt naphthenate and cobalt octoate. For instance, the promoter may comprise about 5 wt % to about 15 wt % of cobalt. In some embodiments, the promoter may comprise about 1 wt % to about 25 wt % of cobalt.

In some embodiments, the polymer layer (110) is prepared from a polymer composition comprising at least 90 wt % of another resin. In some embodiments, the polymer composition comprises at least about 75 wt % to about 95 wt % of another resin. The polymer composition may further include initiators and promoters as previously described.

In some embodiments, the aggregate material (120) may comprise quartz, silica, or a combination thereof. For example, the aggregate material (120) is sand. The aggregate material (120) can have a grit size ranging from about 16 grit to about 60 grit. As known to one of ordinary skill in the art, higher grit numbers correspond to a finer particle size.

In some embodiments, the polymer concrete (100) may further comprise a reinforcing material (140) disposed in at least one of the composite layers (105). Depending on the desired reinforcement, all of the composite layers may contain the reinforcing material or only some of the composite layers may contain the reinforcing material. In one embodiment, the reinforcing material (140) may be disposed between the polymer layer (110) and the aggregate material (120). In another non-limiting embodiment, the reinforcing material (140) may be disposed within a layer of the aggregate material (120). In another non-limiting embodiment, the reinforcing material (140) may be disposed within the polymer layer (110). Examples of the reinforcing material (140) include, but are not limited to, carbon and glass fabric or rods. In preferred embodiments, the reinforcing material (140) is acid-resistant.

Figure 3:
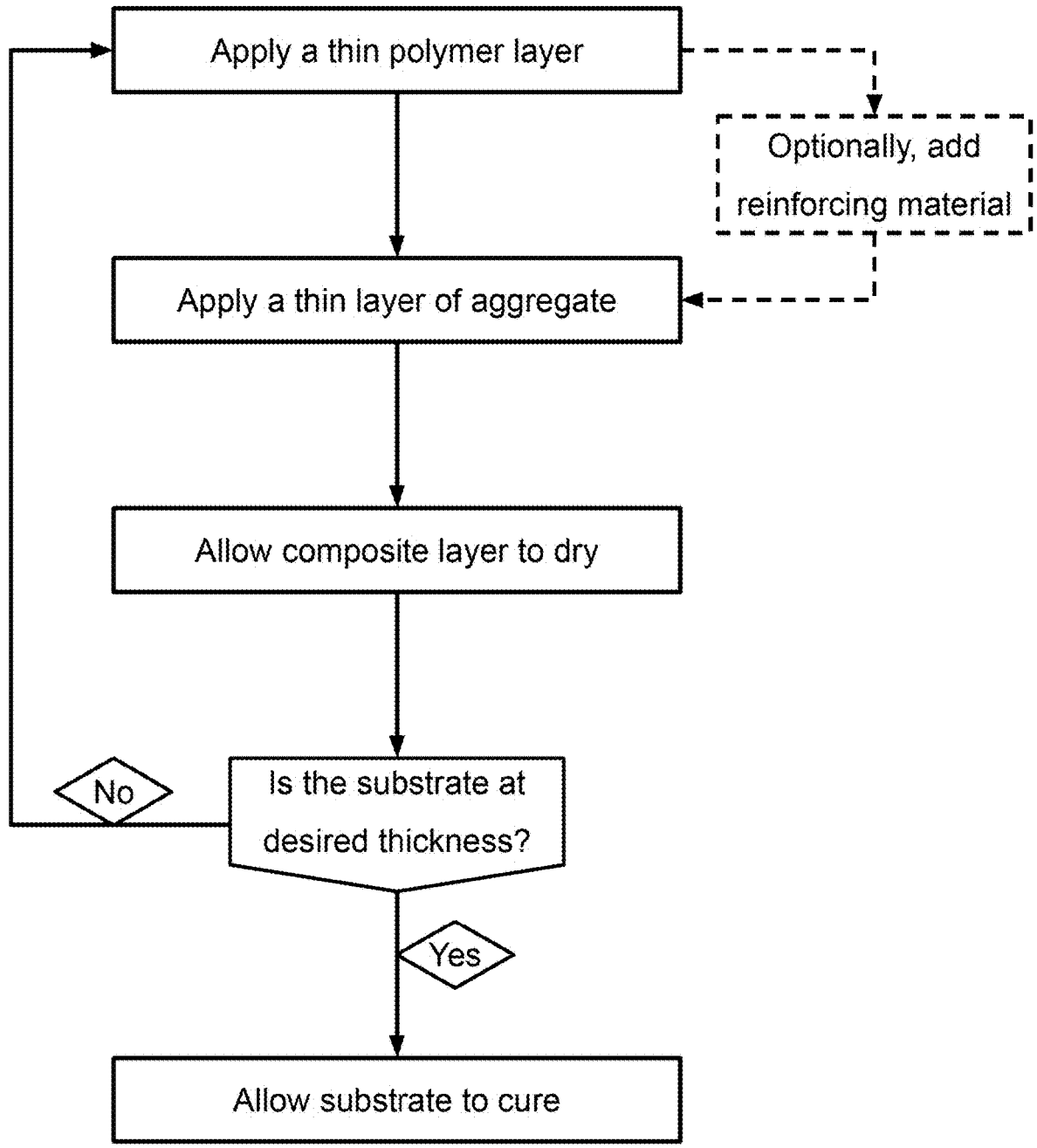
FIG. 3 is a flow diagram of forming the multi-layer polymer concrete.

In some embodiments, the polymer concrete (100) described herein may be produced using methods that improve the structural integrity of the substrate. Accordingly, the present invention provides a novel method of forming the polymer concrete (100) as demonstrated in FIG. 3. The method may comprise laying a first polymer layer (110), applying a layer of aggregate material (120) on the first polymer layer (110), thereby forming a composite layer (105), allowing said composite layer (105) to dry until substantially tack-free, applying a polymer layer (110) on the previous composite layer (105), applying a layer of aggregate material (120) on said polymer layer (110), thereby forming another composite layer (105), and allowing said composite layer (105) to dry until substantially tack-free. The steps of applying a polymer layer (110) on the previous composite layer (105), applying a layer of aggregate material (120) on said polymer layer (110) to form another composite layer (105), and allowing said composite layer (105) to dry until substantially tack-free are repeated until a desired thickness of the polymer concrete (100) is achieved. Once the desired thickness is achieved, the polymer concrete (100) is allowed to cure.

In preferred embodiments, the polymer concrete (100) is acid resistant. Contrary to conventional procedures where the polymer layer is applied in thick layers, the present invention applies the polymer layer in thin layers. Without wishing to limit the present invention, this method is effective for reducing shrinkage of the polymer layer, thereby preventing cracking, debonding, or deformation of the polymer concrete. In some embodiments, the polymer layer may be at most a third of the thickness of the corresponding aggregate layer. In some embodiments, the polymer layer may be $1/20$ to $1/3$ of the thickness of the corresponding aggregate layer. In some embodiments, the polymer layer may be at most half of the thickness of the corresponding aggregate layer. In some embodiments, the polymer layer may be $1/20$ to $1/2$ of the thickness of the corresponding aggregate layer. In this context, the "corresponding aggregate layer" of a polymer layer refers to an aggregate layer disposed adjacent to (above or below) the polymer layer.

In some embodiments, the thickness of each composite layer ranges from about 1 mm to about 9 mm. For example, the thickness of each composite layer may be about 2 mm to about 4 mm. In some embodiments, the number of composite layers (105) ranges from 2 to 20. In some embodiments, the number of composite layers (105) can range from 2 to 50 layers. For example, the layering process may be repeated 6 to 8 times so as to produce a polymer concrete with 8 to 10 layers. In a non-limiting embodiment, the polymer concrete may have 8 to 10 layers for a total thickness of about 1 inch or more. In another non-limiting embodiment, the polymer concrete (100) may comprise ten composite layers (105) that have a combined thickness of about 1 centimeter or more.

In some embodiments, the step of applying the layer of aggregate material (120) on the polymer layer (110) may comprise broadcasting the aggregate material (120) to the point of refusal. Excess aggregate material (120) may be removed after the point of refusal although it is not required. The excess aggregate material (120) can be removed by vacuuming or sweeping.

In further embodiments, the method may include reinforcing the polymer concrete (100) by adding a reinforcing material (140) in at least one of the composite layers (105).

Preferably, the reinforcing material (140) is added to the polymer layer (110) prior to applying the layer of aggregate material (120). In one embodiment, the reinforcing material (140) may be disposed between the polymer layer (110) and the aggregate material (120). In another non-limiting embodiment, the reinforcing material (140) may be disposed within a layer of the aggregate material (120). In another non-limiting embodiment, the reinforcing material (140) may be disposed within the polymer layer (110).

In some embodiments, the polymer concrete (100) can be formed on a pre-existing surface (10), such as a floor or road. The pre-existing surface (10) may be cleaned and/or leveled prior to adding the polymer concrete (100). In another non-limiting embodiment, the polymer concrete may be added to the pre-existing surface (10) without cleaning and/or leveling beforehand. Thus, the method of the present invention can be used to repair a pre-existing surface (10).

Figure 4:
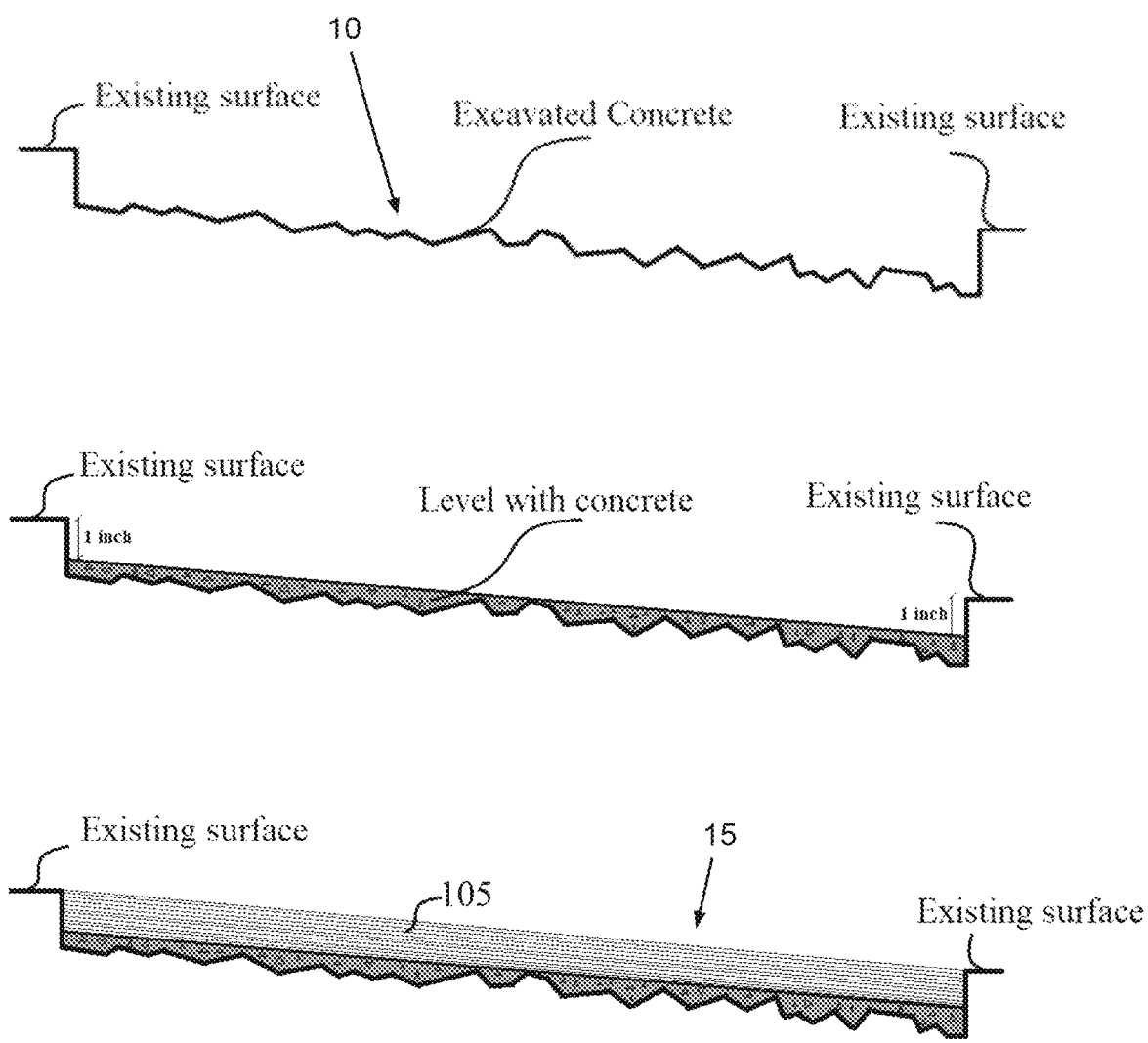
FIG. 4 shows a non-limiting schematic for repairing a surface.

Referring to FIG. 4, in some embodiments, the present invention features a method of repairing a pre-existing surface (10). The method may comprise laying a first polymer layer (110) on the pre-existing surface (10), applying a layer of aggregate material (120) on the first polymer layer (110), thereby forming a composite layer (105), allowing said composite layer (105) to dry until substantially tack-free, applying a polymer layer (110) on the previous composite layer (105), applying a layer of aggregate material (120) on said polymer layer (110), thereby forming another composite layer (105), and allowing said composite layer (105) to dry until substantially tack-free. The steps of applying a polymer layer (110) on the previous composite layer (105), applying a layer of aggregate material (120) on said polymer layer (110) to form another composite layer (105), and allowing said composite layer (105) to dry until substantially tack-free are repeated until a desired thickness of the stacked composite layers is achieved, thereby forming a repaired surface (15) that is acid resistant. Without wishing to limit the present invention, the method reduces shrinkage of the polymer coating, thereby preventing cracking, debonding, or deformation of the stacked composite layers.

In some embodiments, the method further comprises cleaning and leveling the pre-existing surface (10) prior to adding the first polymer layer (110). The pre-existing surface (10) can be leveled by applying concrete to the pre-existing surface. In another non-limiting embodiment, the polymer concrete may be added to the pre-existing surface (10) without cleaning and/or leveling beforehand.

In preferred embodiments, the thickness of the stacked composite layers is such that the top-most composite layer is flushed or leveled with an adjacent surface that was not repaired. In other words, the top-most composite layer and the surrounding surfaces lie on the same plane.

EXAMPLE

The following are non-limiting examples of the present invention. It is to be understood that said examples are not intended to limit the present invention in any way. Equivalents or substitutes are within the scope of the present invention.

Example 1. Preparing the Polymer Composition

1. To about 95 wt % of a novolac epoxy vinyl ester resin, mix in about 0.5 wt % of a promoter comprising about 15 wt % of cobalt.

2. Mix in about 4.5% of methyl ethyl ketone peroxide to the promoted novolac epoxy vinyl ester resin.

Example 2. Preparing the Polymer Composition

1. To about 97 wt % of a novolac epoxy vinyl ester resin, mix in about 0.2 wt % of a promoter comprising about 10 wt % of cobalt.
2. Mix in about 2.8% of methyl ethyl ketone peroxide to the promoted novolac epoxy vinyl ester resin.

Example 3. Floor Repair

1. Remove damaged sections of concrete floor and clean debris.
2. Add cement to the sections such that a smooth and leveled surface is formed and the depth of the sections is about 1 inch.
3. Lay a first polymer layer about 3 mm thick.
4. Broadcast 16 grit sand to the point of refusal.
5. Allow polymer layer to dry until tack-free.
6. Lay another polymer layer about 3 mm thick.
7. Broadcast 16 grit sand to the point of refusal.
8. Allow polymer layer to dry until tack-free.
9. Repeat steps 6-8 until the surface of the top-most layer is at the same level as the undamaged sections of concrete floor.
10. Cure the repaired sections.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A polymer concrete (100) comprising multiple stacked composite layers (105), each composite layer (105) comprising:
    a. a polymer layer (110); and
    b. an aggregate material (120) disposed on top of the polymer layer (110);
   wherein a thickness of the polymer layer (110) is ⅓ to ½ of a thickness of the aggregate material (120);
   wherein the polymer concrete (100) comprises at least two stacked composite layers (105), wherein the polymer concrete (100) is acid resistant.

2. The polymer concrete (100) of claim 1, wherein a number of composite layers (105) ranges from 2 to 20.

3. The polymer concrete (100) of claim 1, wherein the polymer layer (110) is prepared from a polymer composition comprising at least 90 wt % of a vinyl ester resin, and about 0.5 wt % to about 5 wt % of peroxide.

4. The polymer concrete (100) of claim 3, wherein the vinyl ester resin is a novolac epoxy vinyl ester resin.

5. The polymer concrete (100) of claim 3, wherein the polymer composition further comprises about 0.05 wt % to about 0.5 wt % of a promoter.

6. The polymer concrete (100) of claim 5, wherein the promoter comprises about 5 wt % to about 15 wt % of cobalt.

7. The polymer concrete (100) of claim 1, wherein the polymer layer (110) is prepared from a polymer composition comprising at least 90 wt % of an epoxy or polyurethane resin.

8. The polymer concrete (100) of claim 1, wherein the aggregate material (120) comprises quartz, silica, or a combination thereof.

9. The polymer concrete (100) of claim 1, wherein the aggregate material (120) has a grit size of about 16 grit to about 60 grit.

10. The polymer concrete (100) of claim 1, wherein a thickness of each composite layer ranges from about 1 mm to about 9 mm.

11. The polymer concrete (100) of claim 1 further comprising a reinforcing material (140) disposed in at least one of the composite layers (105).

12. The polymer concrete (100) of claim 11, wherein the reinforcing material (140) comprises carbon or glass fabric or rods.

13. The polymer concrete (100) of claim 11, wherein the reinforcing material (140) is disposed between the polymer layer (110) and the aggregate material (120).

14. A method of forming the polymer concrete (100) of claim 1, comprising
    a. laying a first polymer layer (110);
    b. applying a layer of aggregate material (120) on the first polymer layer (110), thereby forming a composite layer (105);
    c. allowing said composite layer (105) to dry until substantially tack-free;
    d. applying a polymer layer (110) on the previous composite layer (105);
    e. applying a layer of aggregate material (120) on said polymer layer (110), thereby forming another composite layer (105);
    f. allowing said composite layer (105) to dry until substantially tack-free; and
    g. repeating steps d.-f. until a desired thickness of the polymer concrete (100) is achieved;
   wherein, for each composite layer (105), a thickness of the polymer layer (110) is ⅓ to ½ of a thickness of the layer of aggregate material (120);
   wherein the polymer concrete (100) is acid resistant, wherein the method reduces shrinkage of the polymer layer, thereby preventing cracking, debonding, or deformation of the polymer concrete.

15. The method of claim 14 further comprising curing the polymer concrete (100) once the desired thickness is achieved.

16. The method of claim 14, wherein a number of composite layers (105) ranges from 2 to 20.

17. The method of claim 14, wherein the polymer layer (110) is prepared from a polymer composition comprising at least 90 wt % of a vinyl ester resin, and about 0.5 wt % to about 5 wt % of peroxide.

18. The method of claim 17, wherein the vinyl ester resin is a novolac epoxy vinyl ester resin.

19. The method of claim 17, wherein the polymer composition further comprises about 0.05 wt % to about 0.5 wt % of a promoter.

20. The method of claim 19, wherein the promoter comprises about 5 wt % to about 15 wt % of cobalt.

21. The method of claim 14, wherein the polymer layer (110) is prepared from a polymer composition comprising at least 90 wt % of a polyester resin.

22. The method of claim 14, wherein the aggregate material (120) comprises quartz, silica, or a combination thereof.

23. The method of claim 14, wherein the aggregate material (120) has a grit size of about 16 grit to about 60 grit.

24. The method of claim 14, wherein applying the layer of aggregate material (120) on the polymer layer (110) comprises broadcasting the aggregate material (120) to the point of refusal.

25. The method of claim 24 further comprising removing excess aggregate material (120) after the point of refusal.

26. The method of claim 14, wherein a thickness of each composite layer ranges from about 1 mm to about 9 mm.

27. The method of claim 14, further comprising reinforcing the polymer concrete (100) by adding a reinforcing material (140) in at least one of the composite layers (105).

28. The method of claim 27, wherein the reinforcing material (140) is added to the polymer layer (110) prior to applying the layer of aggregate material (120).

29. The method of claim 27, wherein the reinforcing material (140) is acid-resistant.

30. The method of claim 27, wherein the reinforcing material (140) comprises carbon or glass fabric or rods.

31. The method of claim 14, wherein the polymer concrete (100) is formed on a pre-existing surface (10).

32. The method of claim 31, wherein said pre-existing surface (10) is leveled prior to adding the polymer concrete (100).

33. A method of repairing a pre-existing surface (10), comprising:
 a. laying a first polymer layer (110) on the pre-existing surface (10);
 b. applying a layer of aggregate material (120) on the first polymer layer (110), thereby forming a composite layer (105);
 c. allowing said composite layer (105) to dry until substantially tack-free;
 d. applying a polymer layer (110) on the previous composite layer (105);
 e. applying a layer of aggregate material (120) on said polymer layer (110), thereby forming another composite layer (105);
 f. allowing said composite layer (105) to dry until substantially tack-free; and
 g. repeating steps d.-f. until a desired thickness of the stacked composite layers is achieved, thereby forming the polymer concrete (100) of claim 1 and forming a repaired surface (15);
  wherein, for each composite layer (105), a thickness of the polymer layer (110) is ⅓ to ½ of a thickness of the layer of aggregate material (120);
 wherein the repaired surface (15) is acid resistant, wherein the method reduces shrinkage of the polymer layer, thereby preventing cracking, debonding, or deformation of the stacked composite layers.

34. The method of claim 33, wherein the thickness of the stacked composite layers is such that the top-most composite layer is flushed with an adjacent surface that was not repaired.

35. The method of claim 33, further comprising cleaning and leveling the pre-existing surface (10) prior to adding the polymer layer (110).

36. The method of claim 35, wherein the surface (10) is leveled by applying concrete to the pre-existing surface.

* * * * *